United States Patent
Devonald

(10) Patent No.: US 7,153,351 B2
(45) Date of Patent: *Dec. 26, 2006

(54) INKS FOR INK JET PRINTING COMPRISING A TRIS-AZO DYE

(75) Inventor: David Phillip Devonald, Manchester (GB)

(73) Assignee: Fujifilm Imaging Colorants Limited, Manchester (GB)

(*) Notice: Subject to any disclaimer, the term of this patent is extended or adjusted under 35 U.S.C. 154(b) by 0 days.

This patent is subject to a terminal disclaimer.

(21) Appl. No.: 10/534,440

(22) PCT Filed: Nov. 13, 2003

(86) PCT No.: PCT/GB03/04938

§ 371 (c)(1), (2), (4) Date: May 10, 2005

(87) PCT Pub. No.: WO2004/046265

PCT Pub. Date: Jun. 3, 2004

(65) Prior Publication Data

US 2006/0060108 A1    Mar. 23, 2006

(30) Foreign Application Priority Data

Nov. 15, 2002    (GB)    .................... 0226710.2

(51) Int. Cl.
- C09D 11/00    (2006.01)
- C09D 11/02    (2006.01)
- C09B 31/16    (2006.01)

(52) U.S. Cl. ................ 106/31.48; 106/31.77; 534/754

(58) Field of Classification Search .......... 106/31.48, 106/31.77; 534/754
See application file for complete search history.

(56) References Cited

U.S. PATENT DOCUMENTS

| | | | |
|---|---|---|---|
| 1,235,253 A * | 7/1917 | Stebbins, Jr. ............. 534/813 |
| 4,009,156 A * | 2/1977 | Kramb .................... 534/815 |
| 4,144,231 A * | 3/1979 | Bauer et al. .............. 534/665 |
| 4,673,735 A * | 6/1987 | Moser et al. .............. 534/606 |
| 4,841,037 A | 6/1989 | Ohta et al. .............. 106/31.52 |
| 6,749,674 B1 * | 6/2004 | Geisenberger et al. ... 106/31.52 |
| 7,041,161 B1 * | 5/2006 | Mistry et al. ............. 106/31.5 |
| 7,052,538 B1 * | 5/2006 | Mistry et al. ............. 106/31.5 |
| 7,056,376 B1 * | 6/2006 | Popat et al. ............. 106/31.52 |
| 2005/0076806 A1 * | 4/2005 | Hanmura et al. ........ 106/31.48 |
| 2005/0126435 A1 * | 6/2005 | Hanmura et al. ........ 106/31.46 |
| 2006/0054054 A1 * | 3/2006 | Devonald ................ 106/31.13 |

FOREIGN PATENT DOCUMENTS

| | | |
|---|---|---|
| EP | 0 449 250 | 10/1991 |
| GB | 2 139 643 | 11/1984 |
| WO | 03/106572 | 12/2003 |

* cited by examiner

*Primary Examiner*—Helene Klemanski
(74) *Attorney, Agent, or Firm*—Morgan Lewis & Bockius LLP

(57) ABSTRACT

Inks comprising a liquid medium and a tris-azo compound of Formula (1) or salt thereof:

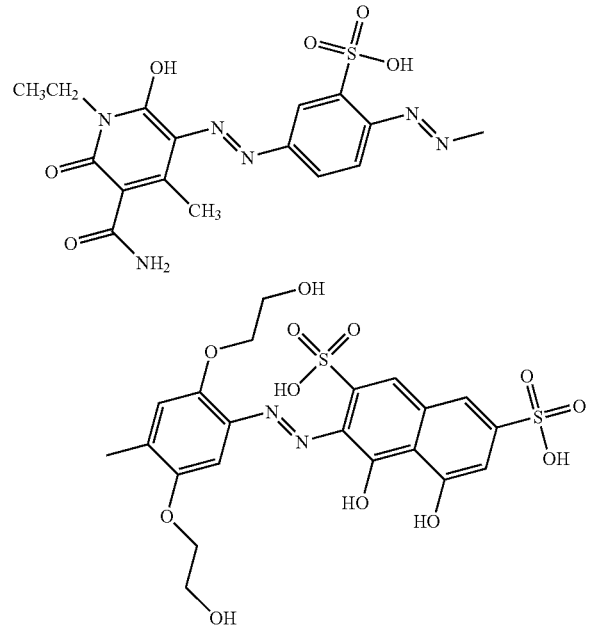

Formula (I)

wherein the liquid medium comprises water and an organic solvent.

13 Claims, No Drawings

INKS FOR INK JET PRINTING COMPRISING A TRIS-AZO DYE

This invention relates to inks of use in ink jet printing ("IJP"). IJP is a non-impact printing technique in which droplets of ink are ejected through a fine nozzle onto a substrate without bringing the nozzle into contact with the substrate.

There are many demanding performance requirements for inks used in IJP. For example they desirably provide sharp, non-feathered images having good water-fastness, light-fastness and optical density. The inks are often required to dry quickly when applied to a substrate to prevent smudging, but they should not form a crust over the tip of ink jet nozzles because this will stop the printer from working. The inks should also be stable to storage over time without decomposing or forming a precipitate which could block the fine nozzles.

We have now devised an ink which is particularly useful for ink jet printing.

According to the present invention there is provided an ink comprising a liquid medium and a tris-azo compound of Formula (1) or salt thereof:

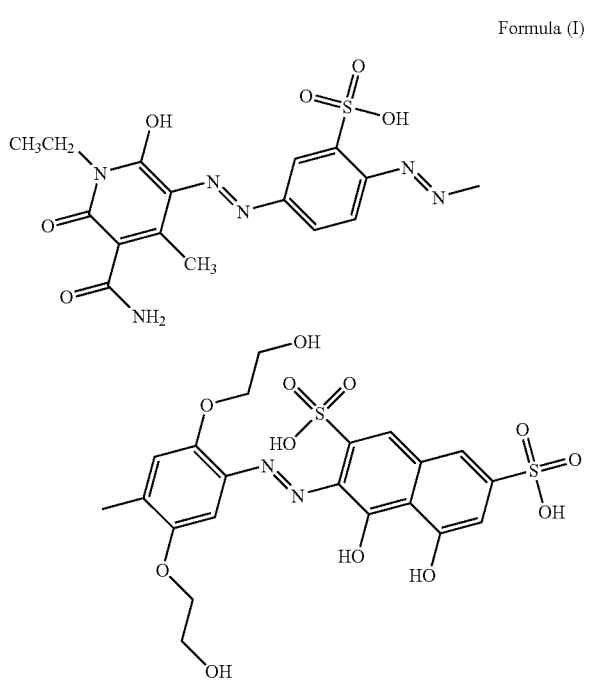

Formula (I)

wherein the liquid medium comprises water and an organic solvent.

When compound of Formula (1) is in the form of a salt preferred salts are alkali metal salts, especially lithium, sodium and potassium salts, ammonium and substituted ammonium salts. Especially preferred salts are salts with ammonia and volatile amines. The free acid form may be converted into a salt using known techniques. For example, an alkali metal salt may be converted into a salt with ammonia or an amine by dissolving an alkali metal salt of the composition in water, acidifying with a mineral acid and adjusting the pH of the solution to pH 9 to 9.5 with ammonia or the amine and removing the alkali metal cations by dialysis.

The ink preferably comprises:
(a) from 0.01 to 30 parts of a compound of Formula (1) or salt thereof; and
(b) from 70 to 99.99 parts of a liquid medium comprising water and an organic solvent;

wherein all parts are by weight and the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

Preferably component (a) is completely dissolved in component (b). Preferably component (a) has a solubility in component (b) at 20° C. of at least 10%. This allows the preparation of liquid dye concentrates which may be used to prepare inks and reduces the chance of the dye precipitating if evaporation of the liquid medium occurs during storage.

The weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)ethanol, 2-[2-(2-methoxyethoxy)ethoxy]ethanol, 2-[2-(2-ethoxyethoxy)-ethoxy]-ethanol and ethyleneglycol monoalylether, cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Typically the liquid medium will further comprise one or more surfactants, for example anionic and/or nonionic surfactants. Examples of anionic surfactants include: Sulfonate surfactants such as Sulfosuccinates (Aerosol™ OT, A196; AY and GP, available from CYTEC) and Sulfonates (Aerosol™ DPOS-45, OS available from CYTEC; Witconate™ C-50H available from WITCO; Dowfax™ 8390 available from DOW); and Fluoro surfactants (Fluorad™ FC99C available from 3M). Examples of nonionic surfactants include: Fluoro surfactants (Fluorad™ FC170C available from 3M); Alkoxylate surfactants (Tergitol™ series 15S-5, 15S-7, and 15S-9 available from Union Carbide); and Organosilicone surfactants (Silwet™ L-77 and L-76-9 available from WITCO).

One or more buffers may optionally be included in the liquid medium to modulate pH of the ink. The buffers can be organic-based biological buffers or inorganic buffers, preferably, organic-based. Examples of preferably-employed buffers include tris(hydroxymethyl)aminomethane (TRIS), available from companies such as Aldrich Chemical (Milwaukee, Wis.), 4-morpholineethanesulfonic acid (MES), 4-morpholinepropanesulfonic acid (MOPS), and beta-hydroxy-4-morpholinepropanesulfonic acid (MOPSO). Further, the buffers employed should provide a pH ranging from about 3 to about 9 in the practice of the invention, preferably about 4 to about 6 and most preferably from about 4 to about 5.

One or more of the biocides commonly employed in inkjet inks may optionally be included in the liquid medium, such as Nuosept™ 95, available from Huls America (Piscataway, N.J.); Proxel™ GXL, available from Zeneca (Wilmington, Del.); and glutaraldehyde, available from Union Carbide Company (Bound Brook, N.J.) under the trade designation Ucarcide 250.

The liquid medium may optionally also include one or more metal chelator. Such chelators are used to bind transition metal cations that may be present in the ink. Examples of preferred metal chelators include: ethylenediaminetetraacetic acid ("EDTA"), diethylenediaminepentaacetic acid ("DPTA"), trans-1,2-diaminocyclohexanetetraacetic acid ("CDTA"), ethylenedinitrilotetraacetic acid ("EGTA"), or other chelators.

In one embodiment inks according to the invention have a pH of from about 3 to about 5, preferably from about 3.5 to about 4.5. In another embodiment the pH of the ink is preferably from 4 to 11, more preferably from 7 to 10.

The viscosity of the ink at 25° C. is preferably less than 50 cP, more preferably less than 20 cP and especially less than 5 cP.

The ink may also contain additional components conventionally used in ink jet printing inks, for example viscosity and surface tension modifiers, corrosion inhibitors and kogation reducing additives.

For the avoidance of doubt, the present invention relates solely to inks containing the compound of Formula (1). The scope of protection sought in this patent specification does not include the compound of Formula (1) per se.

The inks of the present invention provide prints of attractive, neutral black shades that are particularly well suited for the ink jet printing of text and images. The inks have good storage stability and low tendency to block the very fine nozzles used in ink jet printers. Furthermore, the resultant images have good optical density, light-fastness, wet-fastness and resistance to fading in the presence of oxidising air pollutants (e.g. ozone). The inks maybe incorporated into ink jet cartridges and used in ink jet printers by any of the numerous known methods, for example as described in the many patent applications by Hewlett Packard, Seiko Epson, Canon and Lexmark. For example, the inks may be injected into an empty ink jet cartridge and the cartridge re-used in an ink jet printer in the conventional manner.

The invention is further illustrated by the following Example in which all parts and percentages are by weight unless specified otherwise. The abbreviation "Ac" means $CH_3CO$—.

EXAMPLE 1

Preparation of an Ink Comprising:

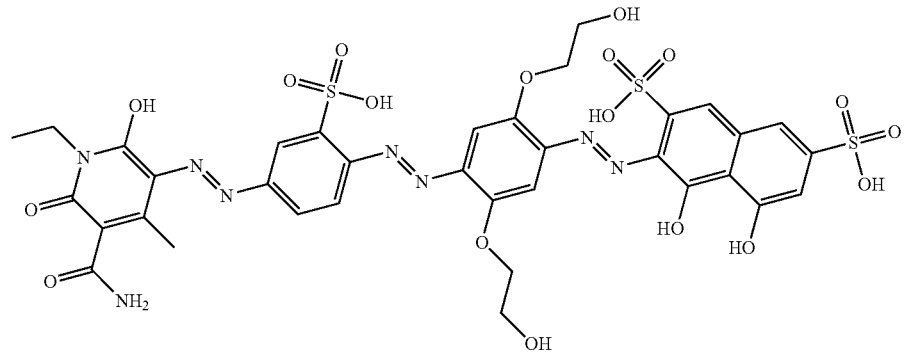

Preparation of Intermediate
2,5-di-(2-acetoxyethoxy)aniline

Step 1—Preparation of 1,4-bis-(2-acetoxyethoxy)hydroquinone

Hydroquinonebis-(2-hydroxyethyl)ether (179 g), acetic acid (100 ml) and acetic anhydride (300 ml) were stirred and heated under reflux overnight. After cooling to room temperature and drowning into water (2 l) the product was isolated by filtration, washed with water, dried and recrystallised from ethanol to give 212 g of product.

Step 2—Preparation of 2-Nitro-1,4-bis-(2-acetoxyethoxy) hydroquinone

The product of step 1 (211.5 g) was dissolved in acetic acid (1800 ml). A mixture of nitric acid (51.9 ml) and acetic acid (200 ml) was then added over 20 minutes keeping the temperature below 20° C. After stirring at room temperature overnight the solution was drowned into water (9 l) and the product isolated by filtration, washed with water and recrystallised from ethanol to give 209 g of product.

Step 3—Preparation of 2,5-di-(2-acetoxyethoxy)aniline

2-Nitro-1,4-bis-(2-acetoxyethoxy)hydroquinone (115 g) was dissolved in ethanol at 50° C. and reduced with hydrogen in the presence of palladium catalyst (2 g, 5% Pd/C). When uptake of hydrogen ceased the solution was screened to remove the catalyst and the filtrates allowed to cool to room temperature. The crystalline solid was isolated by filtration and dried under vacuum to give 90 g of product.

Stage One—Preparation of monoazo-4-(4-Acetylamino-2-sulpho-3-phenylazo)-2,5-di-(2-acetoxyethoxy)aniline

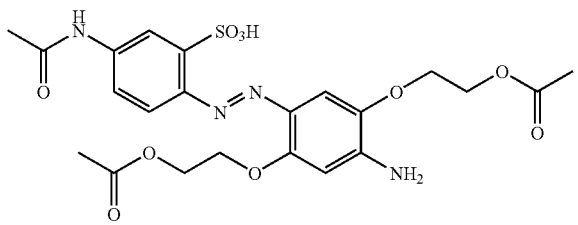

4-Amino-3-sulphoacetanilide (174 g; 0.6 mol) was stirred in water (2.5 l) at pH 9 and sodium nitrite (45.54 g; 0.66 mol) added. The solution was added to ice/water containing concentrated hydrochloric acid (180 ml) with stirring. After stirring for 1.5 h at less than 10° C. the excess nitrous acid was destroyed by the addition of sulphamic acid. 2,5-di-(2-acetoxyethoxy)aniline (178.2 g; 0.6 mol) was dissolved in acetone (1000 ml) and added to the above diazonium salt suspension at 0–10° C. followed by the slow addition of pyridine (30 ml). After stirring overnight at room temperature the precipitated product was filtered-off, washed with water. The damp paste was then stirred in acetone, filtered and dried (50° C.) to give a an orange solid (210 g; 64%).

Stage Two—Preparation of Bisazo Intermediate

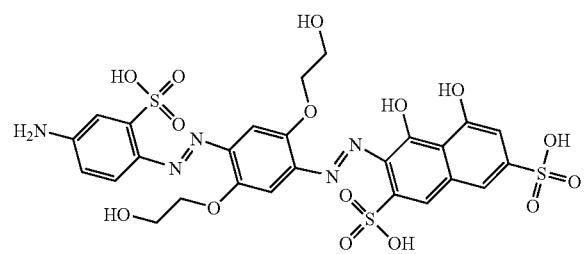

The monoazo product from Stage one (24.75 g; 0.05 mol) was dissolved in water (300 ml) with stirring at pH 10 to which sodium nitrite (6.90 g; 0.1 mol) and acetone (200 ml) were added. The resulting mixture was then added to 0.10 M hydrochloric acid (70 ml) with stirring at room temperature. After stirring for 1 h, the excess nitrous add was destroyed by the addition of sulphamic acid. The resulting diazonium salt was then added to a stirred solution of chromotropic acid (20.00 g; 0.05 mol) at less than 10° C. at pH 7–8 maintained by the addition of 2N lithium hydroxide when necessary. After stirring overnight the product was precipitated by the addition of 25% (w/v) lithium chloride then filtered and washed with 30% lithium chloride solution. The resulting damp paste was suspended in water (700 ml) and lithium hydroxide hydrate (25.00 g; 0.60 mol) added and the solution heated at 70° C. After 3 h the solution neutralised to pH 6–7 by the addition of concentrated hydrochloric acid. The product was precipitated by the slow addition of 20% lithium chloride, filtered and washed with 25% (w/v) lithium chloride solution. The damp paste was dissolved in water and then dialysed to low conductivity. The solution was evaporated to dryness (70° C.) to give a black powder (25.5 g; 67%).

Stage Three—Preparation of Title Dye

The amino disazo compound from Stage Two (0.015 mol) in water (160 ml) was stirred at pH 9 to which calsolene oil (1 ml) and sodium nitrite (1.20 g; 0.0174 mol) were added. The resulting solution was stirred then added to ice/water (100 g) containing concentrated hydrochloric acid (5 ml) with stirring at 0–10° C. After stirring for 1 h at 0–10° C. the excess nitrous acid was destroyed by the addition of sulphamic acid. The resulting diazonium salt was added to a stirred solution of 1-ethyl-1,2-dihydro-6-hydroxy-4-methyl-2-oxo-3-pyridinecarbonamide (3.10 g, 0.158 mol) in water (100 ml) at 0–10° C. and then adjusted to pH 7. After stirring overnight the solution was poured into acetone (3 l) with stirring, filtered and washed with acetone. The solid dissolved in water and dialysed to low conductivity to give after evaporation (80° C.) a black powder (8.9 g; 61%; $\epsilon_{max}$ 81,232 and a $\lambda_{max}$ 601 nm).

Stage 4—Preparation of Ink

An ink may be prepared having the following formulation:

| | |
|---|---|
| 2-Pyrrolidone | 5 parts |
| Thiodiglycol | 5 parts |
| Surfynol ™ 465 | 1 part (from Air Products Inc., USA) |
| Dye | 3 parts |
| Water | 86 parts |

EXAMPLE 2 INK FORMULATIONS

Further inks described in Tables I and II may be prepared wherein the Dye described in the first column is the compound from Example 1. Numbers quoted in the second column onwards refer to the number of parts of the relevant ingredient and all parts are by weight. The inks may be charged into an empty ink jet printer cartridge (e.g. a HP 51625A or 51641A cartridge) and applied to paper by thermal or piezo ink jet printing (e.g. using a HP-DeskJet 340, 540, 600, 840C, 930C or 932c thermal ink jet printer).

The following abbreviations are used in Table I and II:
PG=propylene glycol
DEG=diethylene glycol
NMP=N-methylpyrollidone
DMK=dimethylketone
IPA=isopropanol
MEOH=methanol
2P=2-pyrollidone
MIBK=methylisobutyl ketone
P12=propane-1,2-diol
BDL butane=2,3-diol
CET=Tris(2-aminoethyl)amine buffer
PHO=$Na_2HPO_4$ and
TBT=tertiary butanol
TDG=thiodiglycol Print Test Examples The ink described In Example 1 (stage 4) was ink-jet printed onto a variety of papers using a Hewlett Packard DeskJet 560C™. The CIE colour co-ordinates of each print (a, b, L, Chroma C and hue H) were measured using a Gretag Spectrolino Spectrodensitometer™ with 0°/45° measuring geometry with a spectral range of 400–700 nm at 20 nm spectral intervals, using illuminant D50 with a 2° (CIE 1931) observer angle and a density operation of status A. No less than 2 measurements were taken diagonally across a solid colour block on the print with a size greater than 10 mm×10 mm. The properties of the resultant prints are shown in Table 1, where the example number of the dye used to prepare the ink is indicated in the left hand column, and ROD is Relative Optical Density. The substrates used in Tables 1, 2 and 3 were as follows:

TABLE 1

|  | Number |
|---|---|
| HP Printing Paper ™ | 1 |
| HP Premium Plus MkII ™ | 2 |
| Epson Premium Photo ™ | 3 |
| Ilford Instant Dry ™ | 4 |

| SUBSTRATE | ROD | L | a | b | C | H |
|---|---|---|---|---|---|---|
| 1 | 1.10 | 35 | 0 | −12 | 12 | 268 |
| 2 | 2.12 | 8 | 1 | −11 | 11 | 274 |
| 3 | 2.12 | 8 | 3 | −14 | 14 | 280 |
| 4 | 2.08 | 9 | 0 | −12 | 12 | 269 |

Light Fastness

To evaluate light fastness the prints were irradiated in an Atlas Ci5000 Weatherometer™ for 100 hours. The results are shown in Table 3. The degree of fade is expressed as $\Delta E$ where a lower figure indicates higher light fastness, and $\Delta E$ is defined as the overall change in the CIE colour co-ordinates L, a, b of the print and is expressed by the equation $\Delta E=(\Delta L^2+\Delta a^2+\Delta b^2)^{0.5}$.

TABLE 2

| SUBSTRATE | $\Delta E$ |
|---|---|
| 1 | 17 |
| 2 | 10 |
| 3 | 4 |
| 4 | 7 |

Ozone Fastness

The ink from Example 1 (stage 4) was printed onto the substrate shown using a HP560™ ink jet printer. The printed substrate was then assessed for ozone stability using an ozone test cabinet from Hampden Test Equipment The test was carried out for 24 hours at 40° C. and 50% relative humidity in the presence of 1 part per million of ozone. Fastness of the printed ink to ozone was judged by the difference in the optical density before and after exposure to ozone using a Gretag Spectrolino Spectrodensitometer. Thus, the lower the % OD loss the greater the ozone fastness. The results are shown in Table 4 where the example number of the dye used to prepare the ink is indicated in the left hand column. These clearly demonstrate that inks based on compositions of this invention display good ozone fastness.

TABLE 3

| SUBSTRATE | ROD LOSS % |
|---|---|
| 3 | 17 |
| 4 | 23 |

TABLE I

| Dye Content | Water | PG | DEG | NMP | DMK | NaOH | Na Stearate | IPA | MEOH | 2P | MIBK |
|---|---|---|---|---|---|---|---|---|---|---|---|
| 2.0 | 80 | 5 |  | 6 | 4 |  |  |  |  | 5 |  |
| 3.0 | 90 |  | 5 | 5 |  | 0.2 |  |  |  |  |  |
| 10.0 | 85 | 3 |  | 3 | 3 |  |  |  | 5 | 1 |  |
| 2.1 | 91 |  | 8 |  |  |  |  |  |  |  | 1 |
| 3.1 | 86 | 5 |  |  |  |  | 0.2 | 4 |  |  | 5 |
| 1.1 | 81 |  |  | 9 |  | 0.5 | 0.5 |  |  | 9 |  |
| 2.5 | 60 | 4 | 15 | 3 | 3 |  |  | 6 | 10 | 5 | 4 |
| 5 | 65 |  | 20 |  |  |  |  | 10 |  |  |  |
| 2.4 | 75 | 5 | 4 |  | 5 |  |  |  | 6 |  | 5 |
| 4.1 | 80 | 3 | 5 | 2 | 10 |  | 0.3 |  |  |  |  |
| 3.2 | 65 |  | 5 | 4 | 6 |  |  | 5 | 4 | 6 | 5 |
| 5.1 | 96 |  |  |  |  |  |  |  | 4 |  |  |
| 10.8 | 90 | 5 |  |  |  |  |  | 5 |  |  |  |
| 10.0 | 80 | 2 | 6 | 2 | 5 |  |  | 1 |  | 4 |  |
| 1.8 | 80 |  | 5 |  |  |  |  |  |  | 15 |  |
| 2.6 | 84 |  |  | 11 |  |  |  |  |  | 5 |  |
| 3.3 | 80 | 2 |  |  | 10 |  |  |  | 2 |  | 6 |
| 12.0 | 90 |  |  |  | 7 | 0.3 |  | 3 |  |  |  |
| 5.4 | 69 | 2 | 20 | 2 | 1 |  |  |  |  | 3 | 3 |
| 6.0 | 91 |  |  | 4 |  |  |  |  |  | 5 |  |

TABLE II

| Dye Content | Water | PG | DEG | NMP | CET | TBT | TDG | BDL | PHO | 2P | PI2 |
|---|---|---|---|---|---|---|---|---|---|---|---|
| 3.0 | 80 | 15 |  |  | 0.2 |  |  |  |  | 5 |  |
| 9.0 | 90 |  | 5 |  |  |  |  |  | 1.2 |  | 5 |
| 1.5 | 85 | 5 | 5 |  | 0.15 | 5.0 | 0.2 |  |  |  |  |
| 2.5 | 90 |  | 6 | 4 |  |  |  |  | 0.12 |  |  |
| 3.1 | 82 | 4 | 8 |  | 0.3 |  |  |  |  |  | 6 |

TABLE II-continued

| Dye Content | Water | PG | DEG | NMP | CET | TBT | TDG | BDL | PHO | 2P | PI2 |
|---|---|---|---|---|---|---|---|---|---|---|---|
| 0.9 | 85 |   | 10 |   |   |   |   | 5 | 0.2 |   |   |
| 8.0 | 90 |   | 5  | 5 |   |   | 0.3 |   |   |   |   |
| 4.0 | 70 |   | 10 | 4 |   |   |   | 1 |   | 4 | 11 |
| 2.2 | 75 | 4 | 10 | 3 |   |   |   | 2 |   | 6 |   |
| 10.0 | 91 |   |    | 6 |   |   |   |   |   | 3 |   |
| 9.0 | 76 |   | 9  | 7 |   | 3.0 |   |   | 0.95 | 5 |   |
| 5.0 | 78 | 5 | 11 |   |   |   |   |   |   | 6 |   |
| 5.4 | 86 |   |    | 7 |   |   |   |   |   | 7 |   |
| 2.1 | 70 | 5 | 5  | 5 | 0.1 | 0.2 | 0.1 | 5 | 0.1 | 5 |   |
| 2.0 | 90 |   | 10 |   |   |   |   |   |   |   |   |
| 2 | 88 |   |    |   |   |   | 10 |   |   |   |   |
| 5 | 78 |   |    | 5 |   |   | 12 |   |   | 5 |   |
| 8 | 70 | 2 |    | 8 |   |   | 15 |   |   | 5 |   |
| 10 | 80 |   |    |   |   |   | 8  |   |   | 12 |   |
| 10 | 80 |   | 10 |   |   |   |   |   |   |   |   |

The invention claimed is:

1. An ink comprising a liquid medium and a tris-azo compound of Formula (1) or salt thereof:

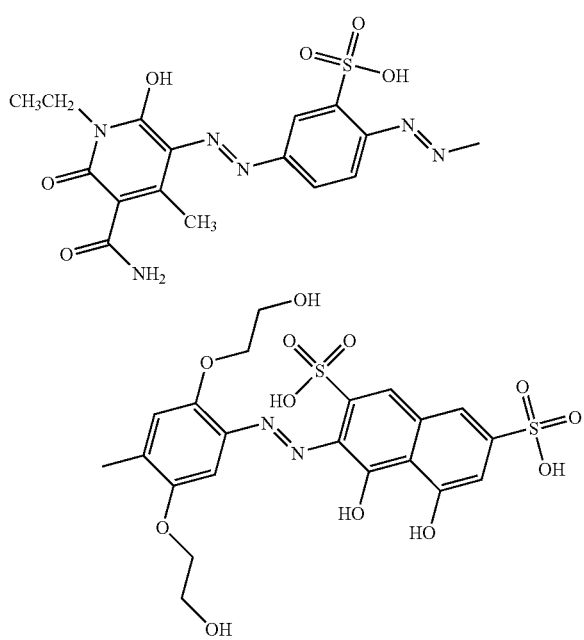

Formula (I)

wherein the liquid medium comprises water and an organic solvent.

2. An ink according to claim 1 which comprises:
   (a) from 0.01 to 30 parts of a compound of Formula (1) or salt thereof; and
   (b) from 70 to 99.99 parts of a liquid medium comprising water and an organic solvent;
   wherein all parts are by weight and the number of parts of (a)+(b)=100.

3. An ink according to claim 2 wherein the number of parts of component (a) is from 1 to 5 parts and the number of parts of component (b) is from 99 to 95 parts.

4. An ink according to claim 2 or 3 wherein component (a) is completely dissolved in component (b).

5. An ink according to claim 1 wherein the liquid medium comprises one or more anionic and/or nonionic surfactants.

6. An ink according to claim 1 wherein the liquid medium comprises one or more pH buffers.

7. An ink according to claim 1 wherein the liquid medium comprises one or more biocides.

8. An ink according to claim 1 wherein the liquid medium comprises one or more metal chelators.

9. An ink according to claim 1 having a pH of 3 to 5.

10. An ink according to claim 1 having a viscosity at 25° C. of less than 50 cP.

11. In the method of ink jet printing, the improvement wherein the ink is an ink according to claim 1.

12. An ink jet cartridge containing an ink according to claim 1.

13. A substrate ink jet printed with an ink according to claim 1.

* * * * *